United States Patent [19]
Bergsma et al.

[11] Patent Number: 5,313,977
[45] Date of Patent: May 24, 1994

[54] FLUID-RESPONSIVE VENT CONTROL VALVE WITH PEEL-AWAY OPENING ACTION

[75] Inventors: Rudolph Bergsma, Ann Arbor; Lindsey E. Waldorf, Whitmore Lake, both of Mich.

[73] Assignee: G. T. Products, Inc., Ann Arbor, Mich.

[21] Appl. No.: 974,655

[22] Filed: Nov. 12, 1992

[51] Int. Cl.$^5$ .............................................. F16K 17/36
[52] U.S. Cl. ...................................... 137/43; 137/202
[58] Field of Search ................... 137/39, 43, 202, 587

[56] References Cited

U.S. PATENT DOCUMENTS

| | | |
|---|---|---|
| 2,069,069 | 1/1937 | Horton . |
| 2,990,842 | 7/1961 | Good ................................ 137/202 |
| 3,306,314 | 2/1967 | Judsen ............................... 137/202 |
| 3,549,119 | 12/1970 | Sellers ................................ 251/84 |
| 3,586,032 | 6/1971 | Weinstein .......................... 137/202 |
| 3,905,689 | 9/1975 | Mylander ........................... 251/77 |
| 3,910,302 | 10/1975 | Sudhir ................................. 137/43 |
| 4,230,142 | 10/1980 | Saarem ............................... 137/202 |
| 4,753,262 | 6/1988 | Bergsma .............................. 137/39 |
| 4,770,201 | 9/1988 | Zakai .................................. 137/202 |
| 4,781,218 | 11/1988 | Mori et al. .......................... 137/202 |
| 4,886,089 | 12/1989 | Gabrlik ............................... 137/202 |

Primary Examiner—Robert G. Nilson
Attorney, Agent, or Firm—Krass & Young

[57] ABSTRACT

The present invention comprises a rollover vent valve for mounting on a vehicle fuel tank to selectively vent fuel vapor from the fuel tank to a vapor trap such as a carbon canister. The valve includes a liquid fuel responsive control element connected to a valve element via lever arm structure to move the valve element between open and closed venting positions on a valve seat. The mechanical opening advantage obtained with the lever arm structure provides for a powerful peel-away action to ensure opening of the valve despite a tank/canister pressure differential acting to maintain the valve element in the closed position. In one embodiment the lever arm structure includes a hammer-claw mechanism to provide an initial pivotal opening force using the maximum potential of the lever arm, and a subsequent rectilinear opening force.

20 Claims, 7 Drawing Sheets

FLUID-RESPONSIVE VENT CONTROL VALVE WITH PEEL-AWAY OPENING ACTION

FIELD OF THE INVENTION

The present invention relates to fluid-responsive vent control valves for use in vehicle fuel tanks to selectively vent fuel vapor from the tank to a vapor trap such as a carbon canister. More specifically, the present invention is a fluid-responsive rollover vent control valve having a high flow outlet opened by a peel-away mechanism.

BACKGROUND OF THE INVENTION

Rollover vent valves are well known in the art for venting fuel vapor from a vehicle fuel tank to the atmosphere or, more recently, to a vapor recovery system such as a carbon canister. Such valves typically vent the interior of the fuel tank to the carbon canister when the fuel in the tank is below the level of the valve, and are closed by a float when the fuel surges in a rollover situation. Closing the valve in response to surging liquid fuel level prevents the overflow of liquid fuel into the carbon canister. If employed as a fill-control vent valve, rather than a rollover vent valve, closure is in response to a full fuel level rather than surge and results in a pressure head within the fuel tank and filler pipe to operate automatic shutoff apparatus built into the fuel fill nozzle.

In U.S. Pat. No. 4,753,262 to R. Bergsma, issued Jun. 28, 1988, a rollover vent valve having a venting outlet closed by a peel-away valve disc is disclosed. When liquid fuel reaches the valve a float member is raised to force the valve disc against the vent outlet, thereby closing it to prevent fuel from reaching the canister. In order to ensure positive opening of the valve when the fuel level drops, the float and the structure connecting it to the valve plate operate to circumferentially lever or peel the valve plate off the vent outlet.

As noted in the above-cited patent, increasing the rate of vapor flow from the fuel tank through the valve to the canister requires an increase in the area of the valve vent outlet. Providing the valve with a large vent outlet increases the force acting to maintain the valve in the closed position once the fuel level drops; i.e., the greater the area of the vent outlet, the greater the closing force on the valve plate caused by the tank/canister pressure differential. With a large vent outlet and corresponding valve plate subjected to a substantial tank/canister pressure differential, the float can "hang-up" despite a drop in the fuel level. The valve would then remain closed, resulting in a rapid and undesirable buildup of pressure in the unvented tank.

SUMMARY OF THE INVENTION

The present invention is a fluid-responsive, high volume rollover vent valve for use in the fuel tank of a vehicle to vent fuel vapor from the tank to a vapor canister. The valve of the present invention provides a positive closing seal for the vent outlet in response to fuel surge, and in rollover situations, as well as a powerful opening force to break that seal and open the valve when the fuel surge recedes or the valve returns to a normal attitude.

The above objects are achieved with a hollow vent valve mounted in the wall of a vehicle fuel tank, having a lower portion with a venting inlet in the interior of the tank, and an upper portion with a high volume venting outlet connected to the vapor canister. A float member is mounted in the lower portion of the valve body to ride up and down therein between a lower open position, and an upper closed position in response to liquid fuel surges or a rollover situation. The float controls a peel-away valve element associated with the vent outlet to open and close the vent.

The valve element generally includes a lever arm portion connected to the float. A closure portion of the valve element conforms to the vent outlet to tightly close it when the float is raised to the closed position. The vent outlet and the float can be axially offset within the valve body to maximize the length of the lever arm. The opening force applied to the valve element when the float drops is accordingly amplified by the mechanical advantage obtained with the long lever arm.

In one embodiment, the float provides a "hammer claw" opening mechanism. The float includes structure to peel the valve element off the vent outlet in a three-step "peel, lock, translate" motion in which a lever-type opening moment is applied to initially peel and break the seal between the valve element and the vent outlet, the valve element is locked to the float, and the float pulls the valve element completely free in an axial direction. In an illustrative version of this embodiment, the lever arm portion of the valve element is slidingly connected to an axial guide post projecting from the upper surface of the float. The upward travel of the valve element along the guide post is limited by two contact points of varying height, the lowest of which first engages the valve element as the float drops to apply a pivotal opening moment which breaks the seal between valve element and vent outlet. Contact with the second contact point ends the pivotal peel and locks the valve element relative to the float for subsequent axial translation to pull it completely free.

In one form the two contact points are embodied in the upper and lower edges of an angled flange atop the guide post. The post can be slightly curved to allow a smooth pivot of the valve element between the initial peel or break and subsequent lock up and axial translation.

In another embodiment of the invention, a compound lever arrangement is utilized to increase the mechanical opening advantage without altering the dimensions of the valve to accommodate a longer lever arm. In a third embodiment of the invention, a compound pulley arrangement is provided to increase the mechanical opening advantage, also without having to substantially increase the dimensions of the valve. These structures create powerful moments with which to peel the valve element off the vent outlet and open the valve against the tank/canister pressure differential acting on the relatively large surface area of the valve element.

In a fourth embodiment the valve element is a flexible, ribbon-like seal connected at one end to the valve body, and at the other end to the float. The closure portion of the valve element conforms to the vent outlet to tightly close it when the float is raised to the closed position. The valve vent outlet has a length greater than its width to define a longitudinal lever arm along which the ribbon seal is peeled off. In this version the vent outlet itself defines two pivot points about which the ribbon seal is levered at two different stages in the opening process. A first pivot point defines a first lever arm and opening moment sufficient to initially break the seal between the ribbon valve element and the vent outlet, while the second pivot point defines a subsequent longer lever arm through which the float acts to finish the opening of the vent outlet.

In all embodiments maximum opening force is applied to achieve the initial break in the seal between the valve element and the vent outlet.

The valve can include gravity-operated rollover structure associated with the float to force the float to a closed position when the vehicle is tilted or rolled over. In a preferred form, however, the float itself is of a buoyancy which permits it to respond rapidly to liquid fuel surge and rollover orientation to close the valve, assisted by a light bias spring to provide the proper mass balance.

Other advantageous features and embodiments of the present invention are described in the following description.

DETAILED DESCRIPTION OF THE DRAWINGS

Figure 1:
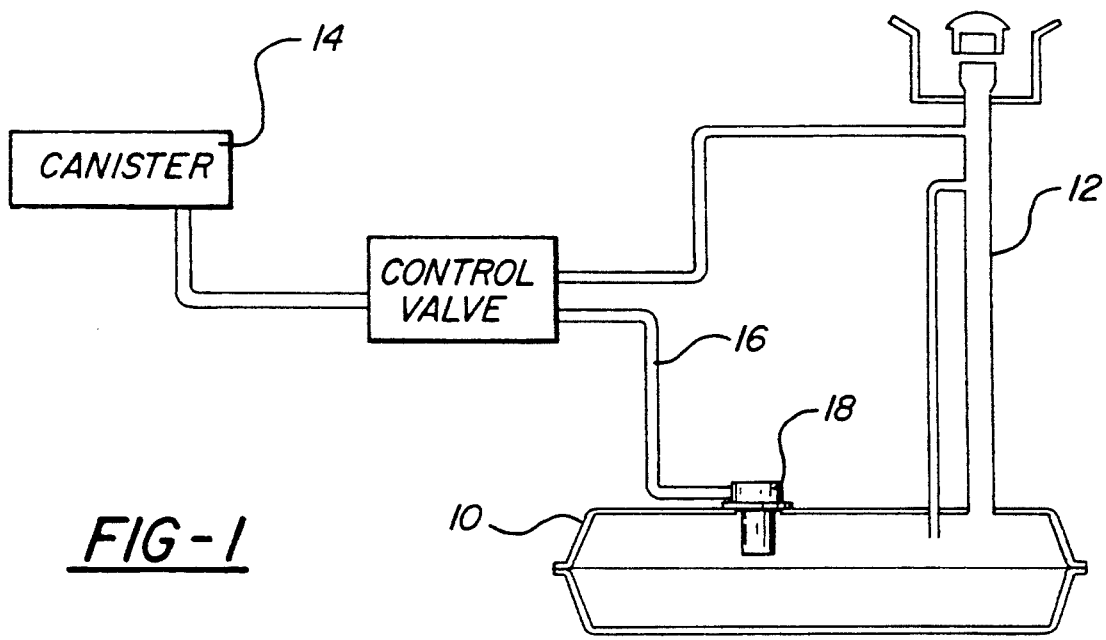
FIG. 1 is a schematic view of a vehicle fuel system employing a valve according to the present invention.
Figure 2:
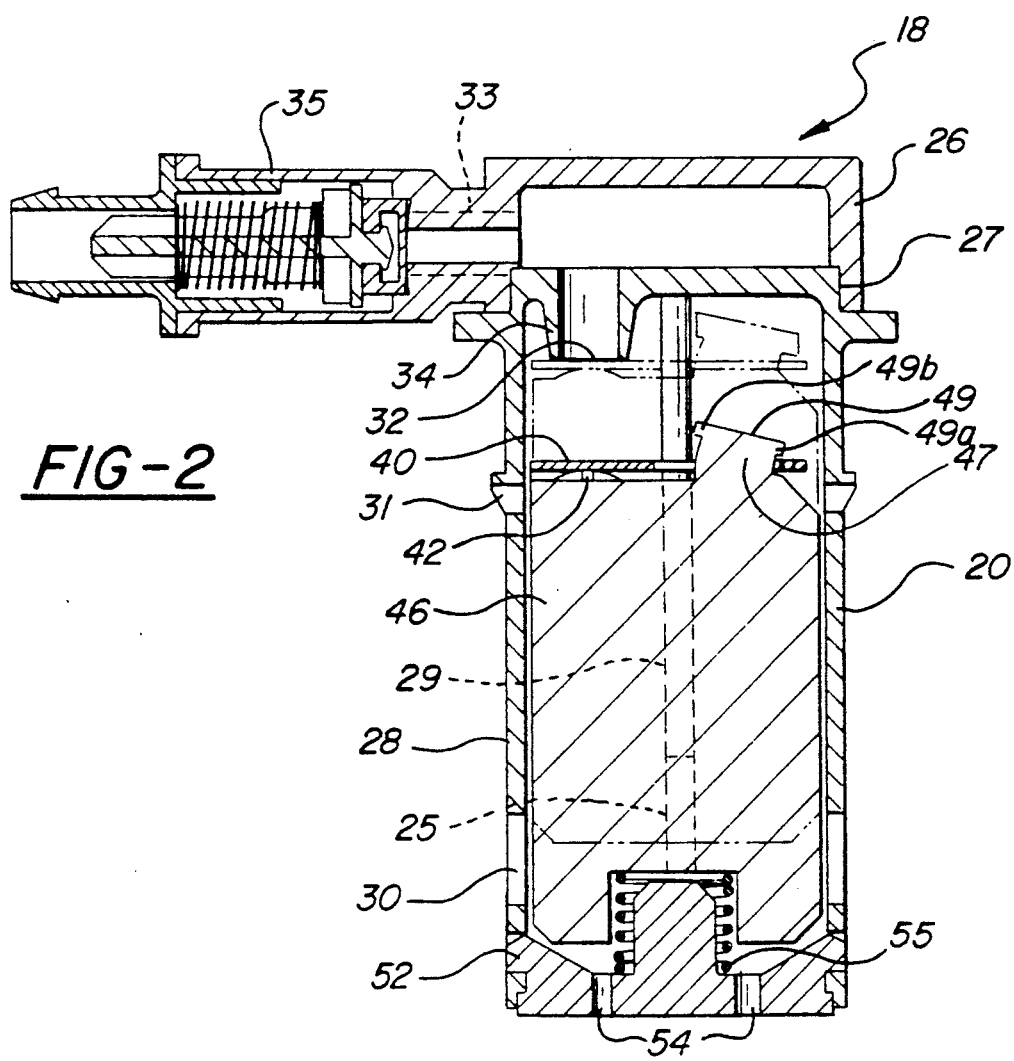
FIG. 2 is a side section view of one embodiment of the valve of the present invention mounted in the wall of a fuel tank.

Referring now to FIGS. 1 and 2, a rollover vent control valve according to the present invention is generally shown by the reference numeral 18, mounted in the fuel tank 10 of a vehicle fuel system including a filler pipe 12 for introducing fuel into the fuel tank and a vapor canister 14 to which fuel vapor is vented from the tank through the valve 18 via a vent line 16. When the fuel level in the tank is below valve 18, valve 18 is open and provides high volume venting of fuel vapor to the canister. When liquid fuel reaches valve 18 due to fuel slosh or surge, or when the attitude of the valve is upset during a rollover situation, the valve responds by closing, thereby shutting off flow to the vapor canister and protecting the canister from saturation. In the rollover scenario, gravity, and optimally additional structure, aids in closing the valve independently of the effects of liquid fuel; i.e., the valve will reliably close in a rollover situation whether or not it is submerged in fuel.

Figure 3:
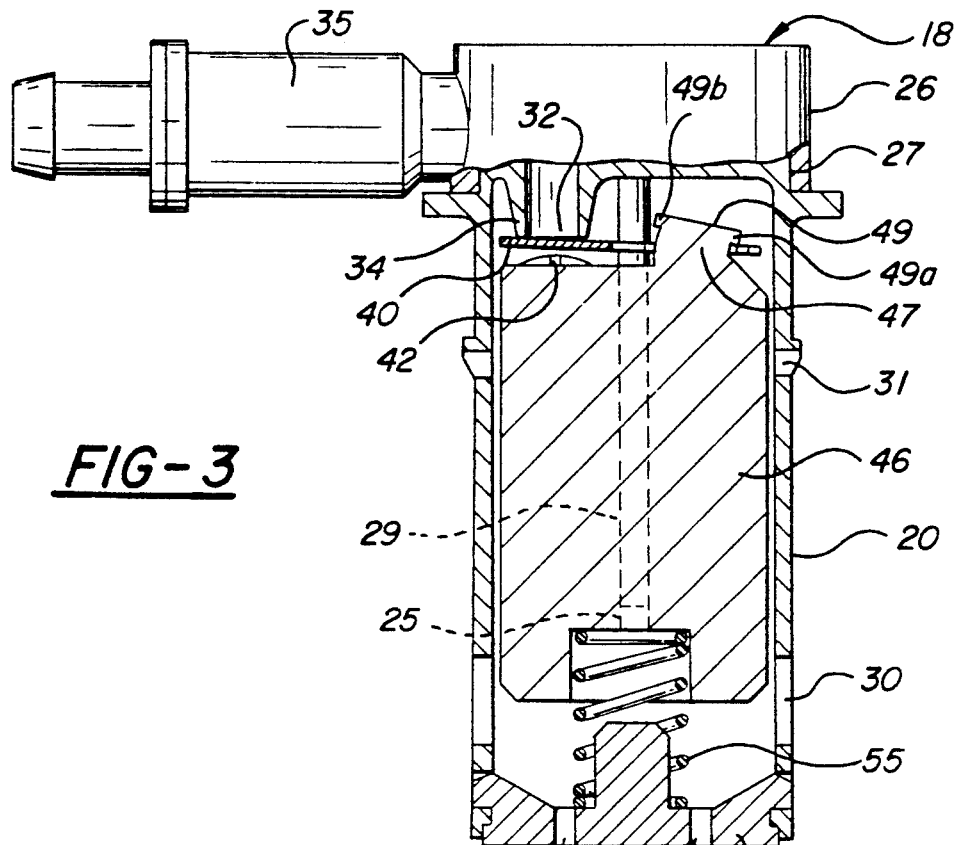
FIG. 3 is a side section view of the valve of FIG. 2 at an initial opening moment.
Figure 4:
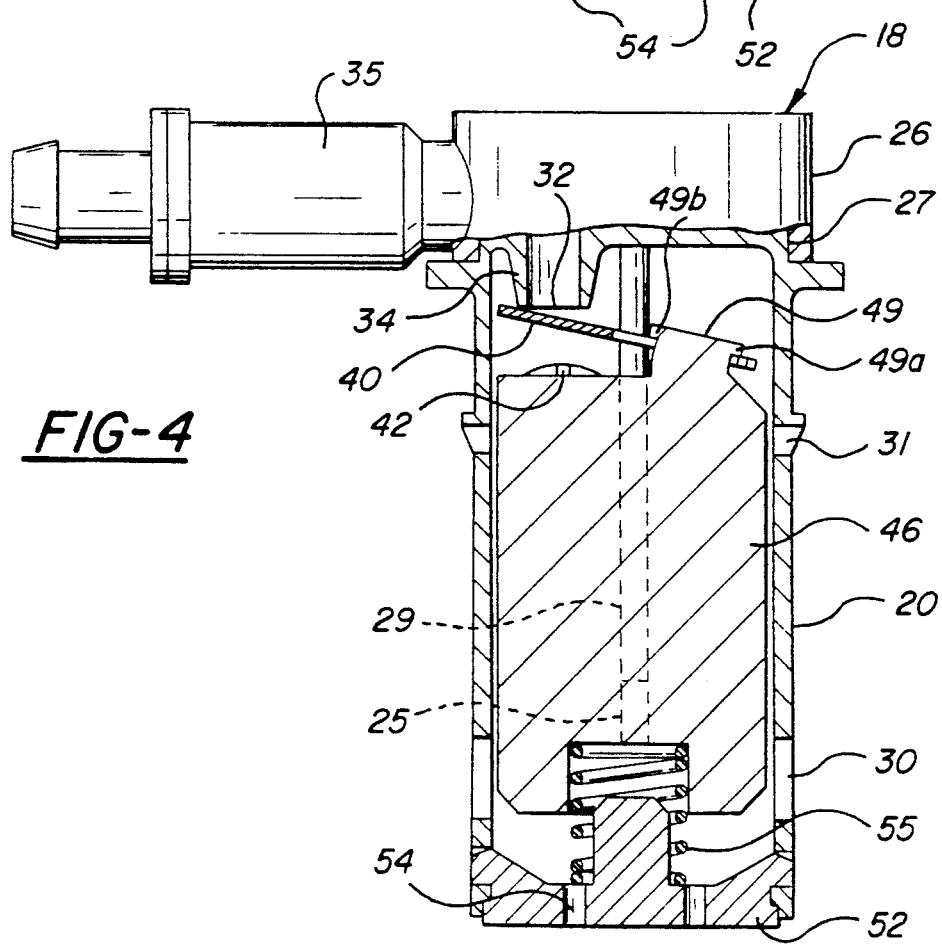
FIG. 4 is a side section view of the valve of FIG. 2 in a half-open condition.

As shown in FIGS. 2-4, valve 18 comprises a hollow valve body 20, preferably molded from a fuel-resistant plastic such as an acetal resin or nylon material, although it will be apparent to those skilled in the art that other materials can be used. Valve body 20 is mounted in a mating recess formed in the wall of the fuel tank, and sealed with respect thereto, for example by a grommet-type seal (not shown). A suitable method for securing the valve to the fuel tank in a liquid- and vapor-tight manner is disclosed in U.S. Pat. No. 4,960,153, issued Mar. 13, 1990.

Hollow valve body 20 includes an upper portion 26 projecting above the wall of the fuel tank when valve 18 is mounted thereto, and a lower portion 28 defining a float chamber extending into the interior of the fuel tank. Upper portion 26 in the illustrated embodiment is ultrasonically welded to the lower portion 28 as shown at 27, although it could be adhesively bonded, crimped or integrally molded with lower portion 28. Lower portion 28 is shown in the drawings as a hollow, essentially cylindrical portion communicating with the interior of the fuel tank via radial venting ports 30 and 31. Valve 18 communicates with the vapor canister via a connector 33 formed in upper portion 26 and a vent line 16 leading from connector 33 to the canister. Accordingly, fuel vapor from the interior of the fuel tank is vented to the vapor canister through a flow path comprising radial venting ports 30 and 31, the interior of lower portion 28, vent outlet 32, connector 33 and vent line 16.

Vent outlet 32 is defined by a valve seat 34 integrally molded in the valve body. Valve seat 34 comprises a raised flange extending downwardly into the float chamber. In the illustrated embodiment it can be seen that valve seat 34 lies in a horizontal plane, although embodiments in which the valve seat is inclined or angled from the horizontal are possible. Vent outlet 32 as defined by valve seat 34 is circular. It should be understood that while the valve seat and vent outlet are preferably circular, other forms are possible.

A fuel level responsive float 46 is positioned within float chamber 28 to ride up and down in response to the level of fuel in the fuel tank. In all of the illustrated embodiments the float comprises a body of a density approximately equal to that of the fuel and sized so as to be freely slidable within the float chamber. Float 46 is also, for example, made from an acetal resin. A light spring 55 biases float 46 upwardly just enough to make it buoyant when submerged in liquid fuel.

The float can alternately be slightly lighter than fuel, or heavier than fuel, so long as the spring 55 is balanced to make the float buoyant in liquid fuel and to force the float to the closed position in a rollover situation in which it is submerged in liquid fuel. If a lighter-than-fuel float is used, additional gravity-operated rollover structure, for example a weighted rollover plate or ball, can be employed to overcome its buoyant tendency to move toward the valve-open position when the valve is tilted more than 90° from the upright and submerged in liquid. The float will of course close in the rollover situation where the float is not submerged in liquid fuel, by way of gravity if tilted more than 90° from upright, and by way of spring 55 or the above-mentioned gravity-operated structure if the valve is tilted to a 90° orientation. Suitable gravity-operated rollover assist structure is disclosed, for example, in co-owned and co-pending U.S. application Ser. No. 772,778 filed Oct. 7, 1991.

An end plate 52 having one or more drain slots 54 formed therein seals the lower end of lower portion 28 to retain float 46 within the valve.

Float 46 is freely axially slidable within the float chamber defined by lower portion 28 of the valve body, limited in its upward travel by valve seat 34, and in its downward travel by end plate 52. Guide rods 29 on the inside periphery of float chamber 28 mate with grooves 25 in float 46 to prevent it from rotating within the float chamber. As float 46 is raised and lowered by changes in the level of liquid fuel communicating with the float through radial ports 30 and drain slots 54 in end plate 52, a valve element 40 connected to the upper surface of the float is correspondingly raised up or down. With float 46 in the fully raised position shown in broken lines in FIG. 2, valve element 40 is in the closed position in which the valve element covers and seals valve seat 34. In its lowermost position shown in solid lines in FIG. 2, float 46 has peeled valve element 40 off valve seat 34.

In a particularly advantageous embodiment, a pressure relief valve 35 is connected to upper portion 26 to vent the tank to the atmosphere in excess pressure conditions.

Figure 10:
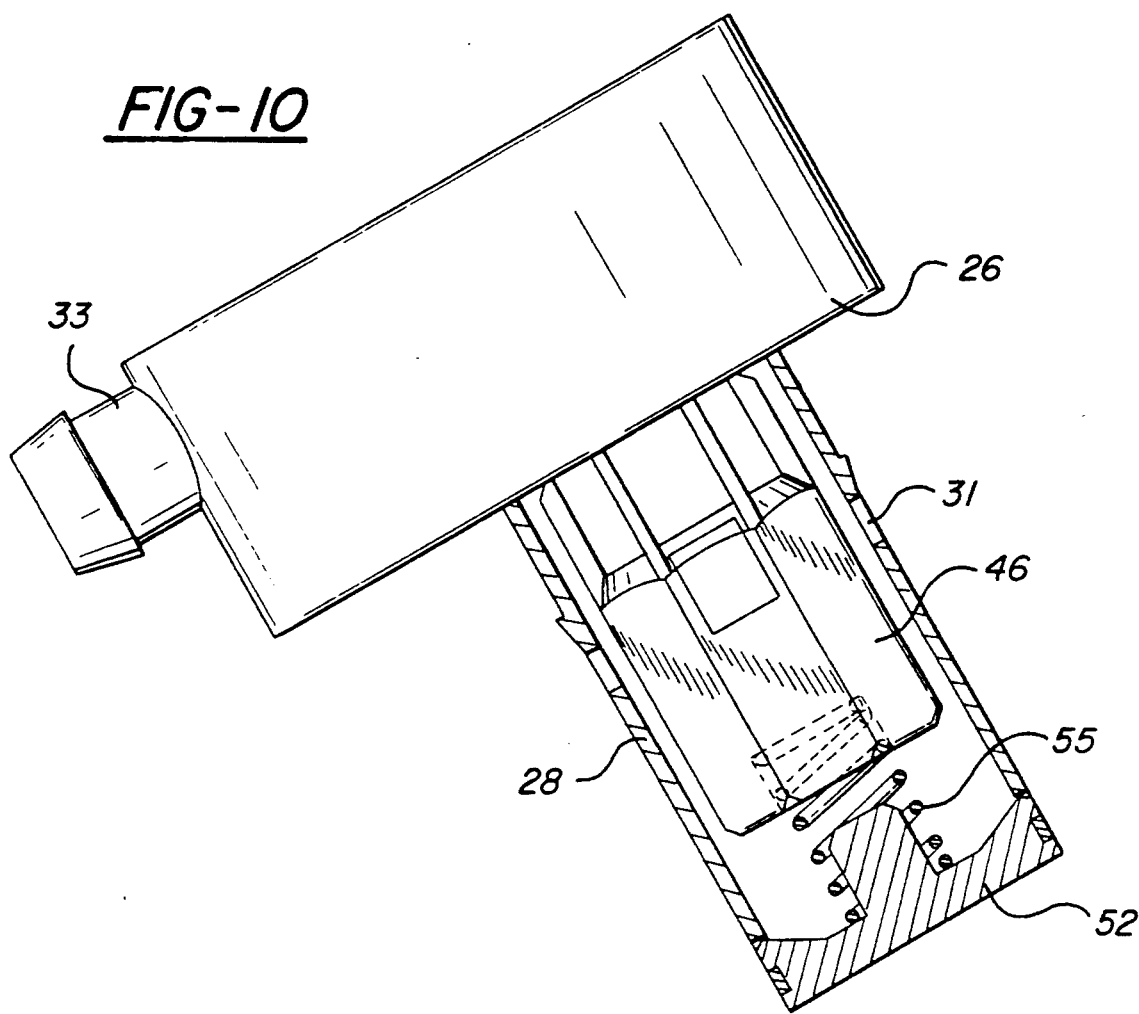
FIG. 10 is a partial side section view of the valve of FIGS. 2-4 in a tilt or rollover situation.

When the vehicle is sharply tilted or rolled over as in FIG. 10, gravity and spring 55 acting on the float 46 force it toward the valve seat 34 and the closed valve position. When oriented sideways the float may not be submerged in fuel, such that only spring 55 exerts closure force on float 46 against the friction between the float and the float chamber. It is therefore preferable that spring 55 or other rollover assist structure be sufficient to close float 46 when lying on its side, without the assistance of gravity or fuel buoyancy.

Figure 11:
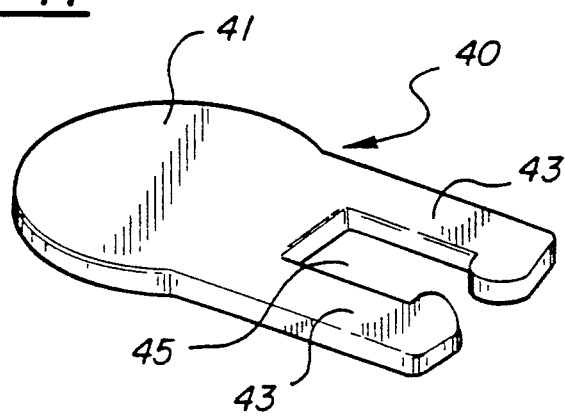
FIG. 11 is a perspective view of the valve element of FIGS. 2-4.
Figure 12:
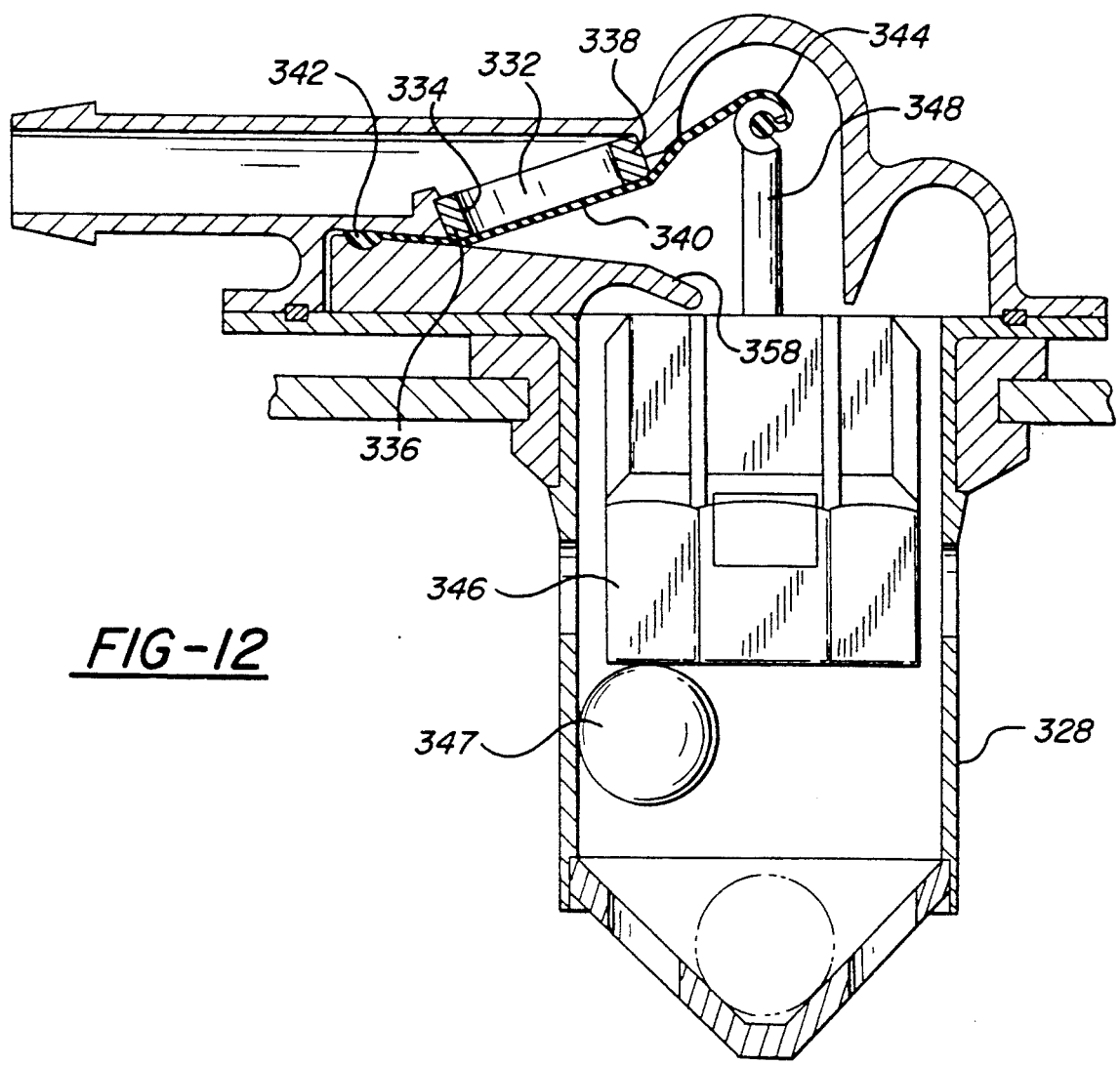
FIG. 12 is a side section view of a fourth embodiment of valve opening structure according to the present invention.

Referring to FIGS. 2 to 4, the details of the valve element and vent outlet in a first embodiment of the invention are set forth. As previously described, valve seat 34 defines an essentially circular vent outlet 32. Valve element 40 is in the form of a thin, fairly rigid plate or paddle, in the illustrated embodiment made from Celcon, the trade name for an acetal resin made by Hoechst Celanese, or from a nylon material. It will of course be understood by those skilled in the art that other suitable fuel-resistant materials may be used, including for example other non-brittle resins or even metal. As best shown in FIG. 11, valve element 40 has a rounded vent closure end 41 and a lever arm portion generally comprising two prongs 43 with a rectangular cutout region 45 for attachment to post 47 on float 46 in a snap fit. Although the vent closure portion 41 of paddle 40 is shown as circular, any shape is suitable as long as it sufficiently seals and interacts with vent opening 32 and outlet 34.

While valve element 40 in the illustrated embodiments of FIGS. 1-11 is essentially rigid, it can also be made from a more flexible, pliable material if desired. A pliable valve element 40 has the advantage of forming a tighter more conforming seal with the valve seat, but it will be somewhat less responsive in opening than a rigid valve element.

Float 46 is provided on its upper end with a rectangular guide post 47 exhibiting a slight curve away from valve seat 34. Post 47 can be integrally molded with float 46. Guide post 47 is topped by a claw flange 49 whose lower surface is angled from the horizontal slightly less than the upper portion of post 47 immediately adjacent. The effect is that flange 49 is tilted back slightly toward vent outlet 32 such that the angle at the post/flange junction nearer the vent outlet is acute and at the junction opposite is obtuse. End 49a of flange 49 is lower with respect to float 46 than end 49b nearer vent outlet 32.

Paddle 40 is connected to rectangular guide post 47 in a snap fit via prongs 43 and matching rectangular cutout region 45. Once connected, paddle 40 slides freely up and down post 47, limited in its travel by flange 49 and the upper surface of float 46. Paddle 40 normally rests at the base of post 47 as shown in FIG. 2, with its free end 41 resting on a shallow cruciform bead 42 on float 46. Bead 42 centers paddle 40 against valve seat 34 when the float is raised to close the valve. The cruciform crosssection of bead 42 prevents an improperly assembled valve from passing inspection, since the non-solid bead cannot seal vent outlet 32 without a valve element 40. Air and vapor will bleed between the arms of the cross of the bead through the vent outlet during inspection if valve element 40 has been omitted, alerting the person inspecting the valve to the defect.

A comparison of FIGS. 2-4 illustrates the opening action of valve element 40. When the valve is in the closed position shown in broken lines in FIG. 2, a tank/canister pressure differential acts across the area of the valve element overlying vent outlet 32 tending to keep it in the closed position. As float 46 drops with the liquid fuel level, however, its weight acts through claw flange 49 to peel or pry paddle 40 loose in a peel, lock and translate motion. Lower end 49a of flange 49, farthest from the outlet and therefore generating the greatest moment, first contacts prongs 43 to create an initial opening moment sufficient to peel and break the seal between valve element 40 and vent outlet 34 as shown in FIG. 3. The initial break effectively eliminates the tank/canister differential across the valve element, and further downward travel of float 46 levers the prong end of the valve element into full locking engagement flush with claw flange 49 as shown in FIG. 4. The arcuate nature of the surfaces of guide post 47 on which valve element 40 rides ensures smooth pivotal travel of the valve element from the initial break to its full engagement with claw flange 49.

Once this lock occurs, vent closure end 41 is still in partial contact with valve seat 34. The pivotal opening action of the paddle ceases and float 46, acting through claw flange 49, now exerts an axial, translational opening force on the valve element to pull it completely free. Valve element 40 then drops to the rest position shown in solid lines in FIG. 2.

Accordingly, the opening of the peel-away valve element 40 occurs in a three-step motion: the initial pivotal peel-away break effected by the lower end 49a of claw flange 49; the lock between flange 49 and valve element 40; and the subsequent axial translation of valve element 40.

The "hammer claw" or "pry bar" mechanism of the embodiment of FIGS. 2-4 achieves an approximately 6:1 mechanical advantage with respect to the opening force applied to valve element 40. The mechanical advantage of the hammer claw embodiment of the invention is of course a function of the length of the lever arm portion of valve element 40 between the leftmost edge of valve seat 34 (the pivot point) and contact point at lower end 49a of flange 49. The 6:1 ratio was deemed to be optimum in view of the size limitations of the overall valve in this particular embodiment. By increasing the width of float 46 or the radial offset of float 46 and valve seat 34, it is possible to employ and utilize a valve element with a longer lever arm portion.

Figure 5:
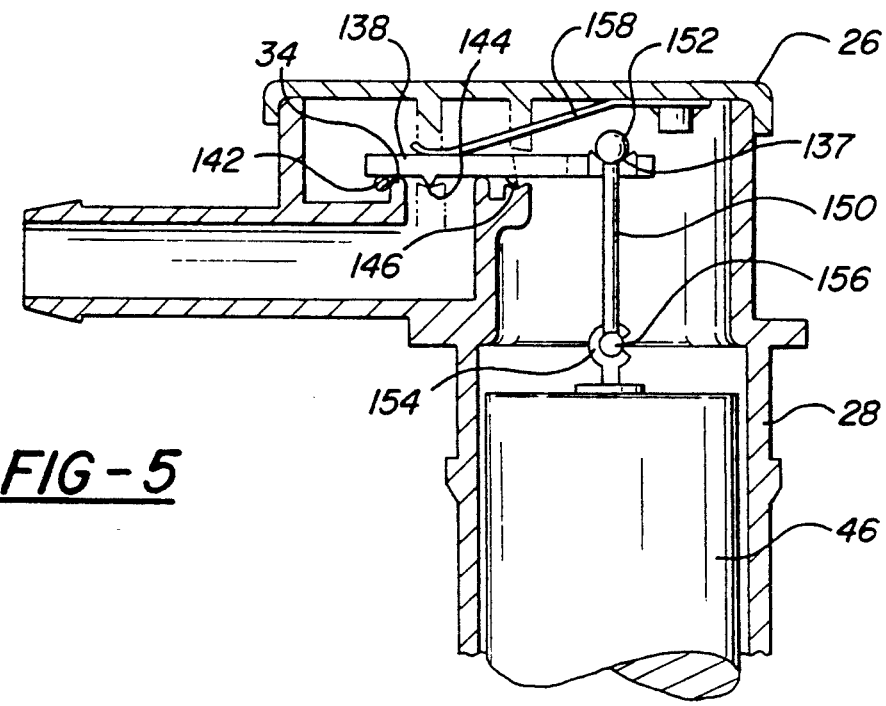
FIG. 5 is a side section view of a second embodiment of a valve according to the present invention.
Figure 6:
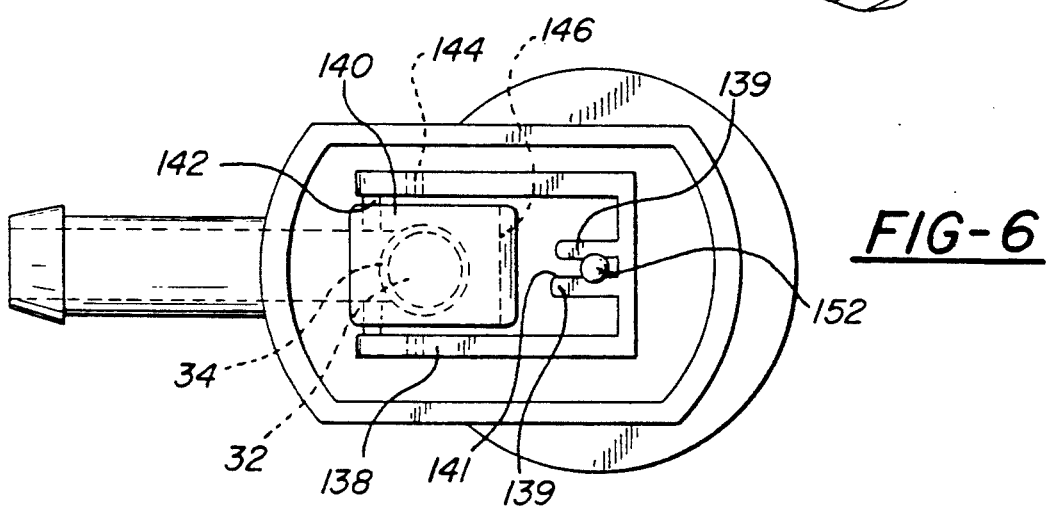
FIG. 6 is a plan view of the valve of FIG. 5.
Figure 7:
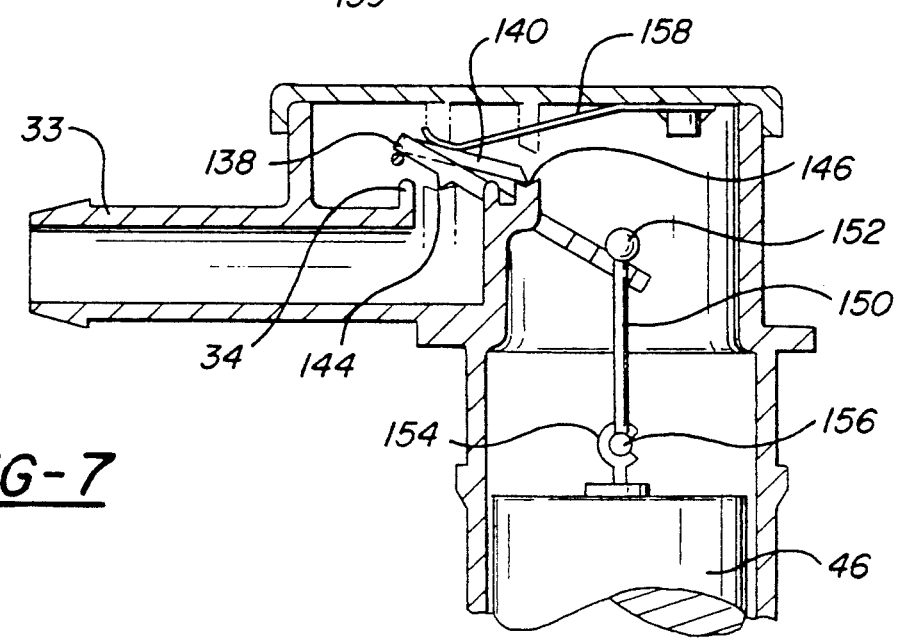
FIG. 7 is a side section view of the valve of FIG. 5 in an open condition.

Referring now to FIGS. 5-7, an alternate embodiment of the invention is illustrated using a compound lever arrangement to increase the mechanical opening advantage exerted by the float.

In FIGS. 5-7 the compound lever embodiment of the valve opening mechanism is shown generally comprising an outer rectangular lever arm 138 and an inner rectangular valve element 140. Valve element 140 in the valve closed position shown in solid lines in FIG. 5 completely covers valve seat 34. Valve element 140 is connected at one end to lever arm 138 by way of an actuation pin 142 integrally formed in lever arm 138 and defining one end thereof. The cylindrical actuation pin 142 slightly mates with a suitable smooth surface on the end of valve element 140. Valve element 140 rotates about pivot point 146.

The end of lever arm 138 opposite actuation pin 142 includes two inwardly extending prongs 139 having beveled ends 141 to engage a float control arm 150 in a snap-fit. Control arm 150 is retained laterally between the prongs by the beveled ends 141 and vertically by a ball 152 on the end of control arm 150. Control arm 150 has formed at its opposite end a short cylindrical cross bar 156 engaged in a snap-fit by hook 154 fastened to float 46 in a suitable manner. The upper surfaces of prongs 139 are preferably rounded as shown at 137 to permit some rotation about ball 152.

Lever arm 138 pivots about a pivot point 144 near its free end. The free end of valve element 140 pivots at pivot point 146 on a knife edge internally of lever arm 138.

Accordingly, when float 46 is raised by the fluid level in the fuel tank to the upper position shown in solid lines in FIG. 5, both the lever arm 138 and valve element 140 rest horizontally, valve element 140 mating with valve seat 34 to seal off vent outlet 32. A leaf spring 158 connected at one end to upper portion 26 of the valve body provides additional sealing force to valve element 140 and maintains it in contact with actuation pin 142. When float 46 drops, lever arm 138 commences to pivot about pivot point 144 such that actuation pin 142 is levered upwardly in arcuate fashion away from the region of valve seat 34. At the same time, actuation pin 142 applies upward opening force to the end of valve element 140 to raise it off the valve seat 34.

This compound lever embodiment achieves a 12:1 mechanical advantage. The force applied through the simple lever arm of 138 is compounded through the additional lever arm of valve element 140 itself; i.e., the opening force generated by the long lever arm 138 is compounded by application to the shorter lever arm of valve element 140. This arrangement greatly increases the opening force without a corresponding increase in the dimensions of the float chamber or valve body as would be necessary with a simple lever arm.

Figure 8:
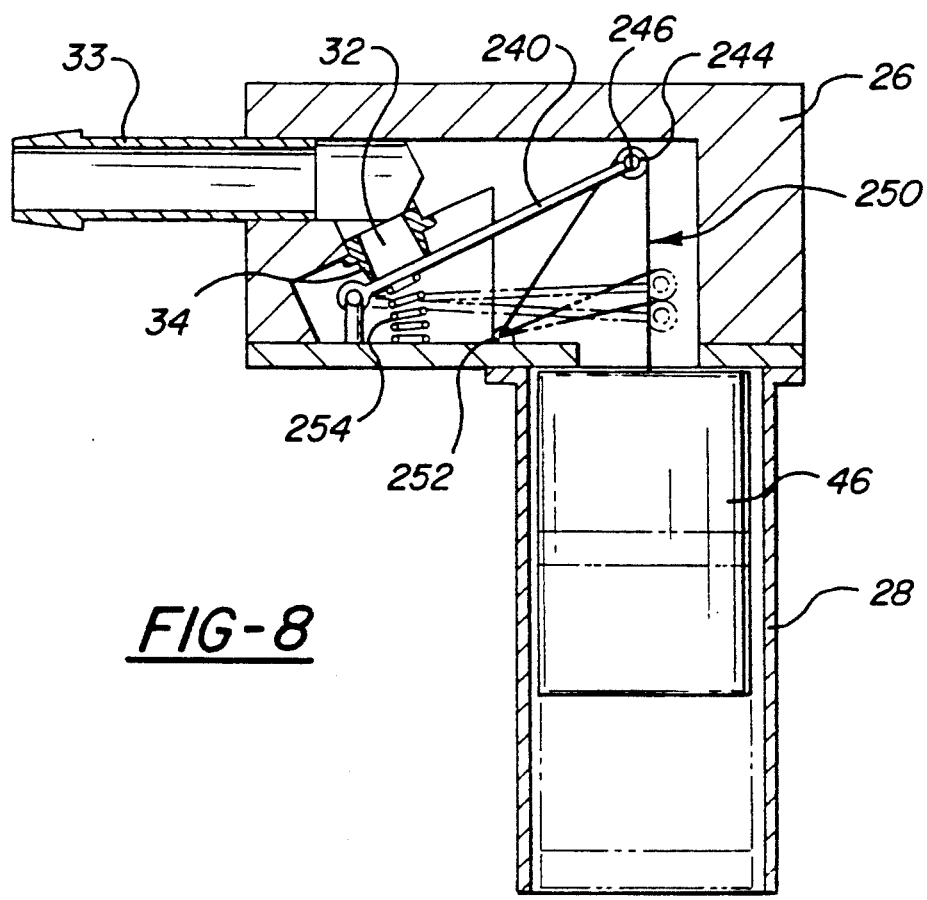
FIG. 8 is a side section view of a third embodiment of a valve according to the present invention.
Figure 9:
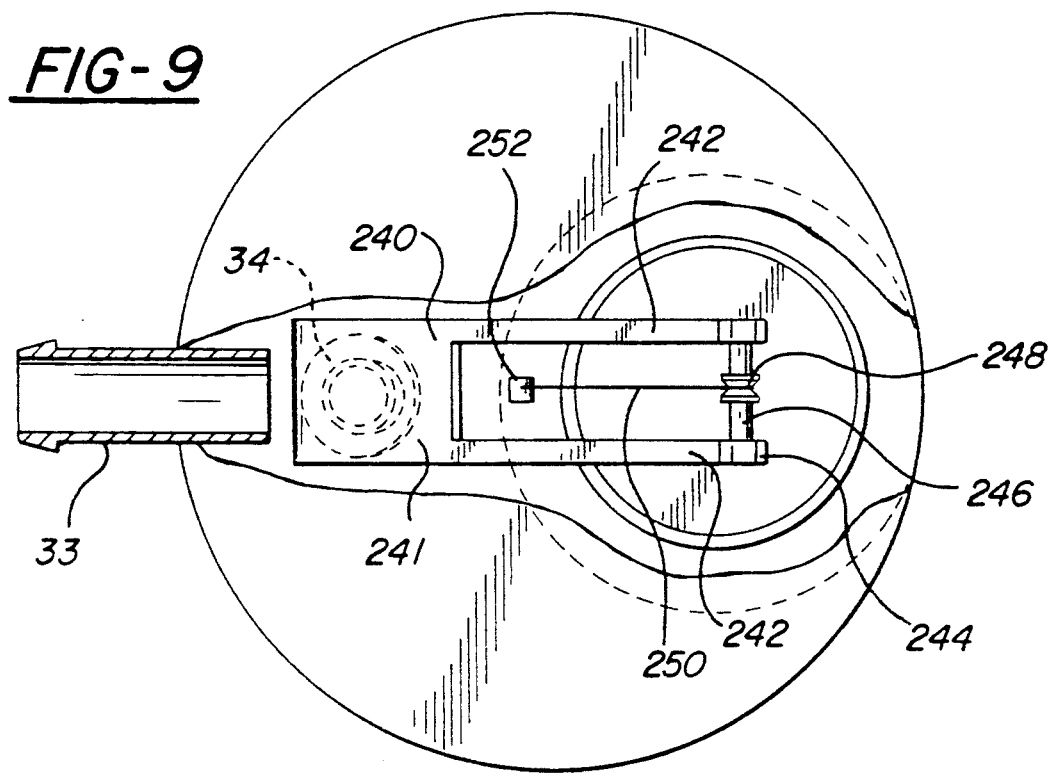
FIG. 9 is a plan view of the valve of FIG. 8.

A third embodiment of the valve opening mechanism is shown in FIGS. 8-9 and comprises a compound pulley system.

Valve element 240 comprises a solid valve closure portion 241 and two support arms 242 extending out to a point above the float. The end of valve element 240 adjacent valve seat 34 has a circular eye 244 pivotally engaging a transverse pivot post 246 so that valve element 240 can pivot up and down, on and off valve seat 34 to open and close the vent outlet 32.

Arms 242 rotatably support therebetween at least one pulley wheel 248. An anchor post 252 is formed on the valve body intermediate the pivot post 246 and the float chamber. Pulley cord 250 is fastened at one end to anchor post 252, looped over and around pulley wheel 248, and fastened at the other end to float 46.

A bias spring 254 provides upward tension to valve element 240 such that when float 46 is raised spring 254 forces valve element 240 to the valve closed position shown in solid lines in FIG. 8. When the float drops, the moment generated by the downward force on the support arm end of valve element 240 is compounded by the mechanical advantage provided by pulley 248 and cord 250. The pulley converts the relatively large amount of axial float travel into a relatively small amount of arcuate valve element travel to increase the opening force.

A fourth embodiment of the peel away valve-opening mechanism according to the present invention is shown in FIGS. 12-16. Vent outlet 332 in this embodiment is defined by an oval valve seat 334 in upper portion 326 of the valve body. Valve seat 334 comprises a raised flange extending in the direction of the interior of lower portion 328 of the hollow valve body. In the illustrated embodiment, it can be seen that valve seat 334 lies in a plane inclined or angled from the horizontal, running from a lower end 336 to an upper end 338. Vent outlet 332 is defined by oval valve seat 334 as a long, narrow oval whose length is substantially greater than its width, such that it essentially takes the form of a slot having rounded ends.

Float 346 in FIGS. 12-16 can be essentially the same as any of the embodiments described above. Accordingly, it is not shown or described in detail in FIGS. 12-16. Rollover structure 347, shown here as a well-known ball and ramp mechanism, can likewise take the form of any of the embodiments described above, so long as it works in complementary fashion with float 346.

A flexible, peel away ribbon valve element 340 is fastened at one end 342 to the interior of valve body 320 adjacent lower end 336 of valve seat 334. At its other end 344 valve element 340 is connected to float 346 adjacent upper end 338 of valve seat 334. Valve element 340 has a length greater than that of the valve seat such that its end 344 extends beyond upper end 338 of valve seat 334 into the interior of the hollow valve body 320. As illustrated, valve element 340 is a rectangular sheet of pliable material, for example fluorosilicon rubber, having an area sufficient to completely cover vent outlet 332 and valve seat 334. The flexible nature of valve element 340 allows it to effectively pivot about its end 342 fastened to the interior of the valve body 320. The longitudinal axis of valve element 340 is essentially aligned with vent outlet 332 and valve seat 334, as best shown in FIG. 313.

A shallow guide ramp 358 is formed in lower portion 328 of the valve body, having a width corresponding to the width of ribbon valve element 340. Guide ramp 358 provides a shallow ramp surface for supporting the ribbon valve element 340 as hereinafter described.

Figure 16:
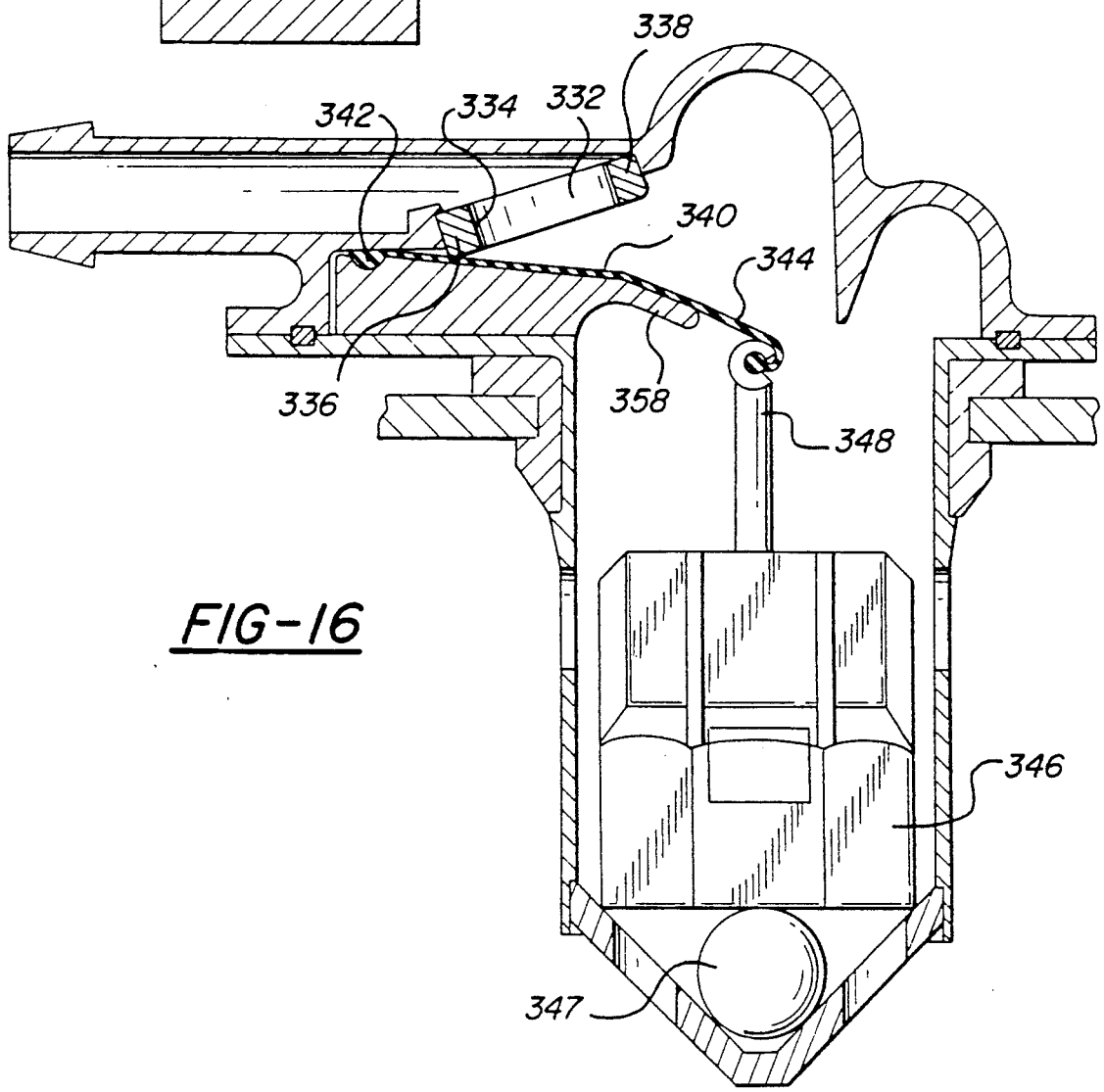
FIG. 16 is a side section view of the valve of FIG. 12, but in an open venting position.

As float 346 is raised and lowered in response to fuel surge or a rollover situation, ribbon valve element 340 is correspondingly pulled up or down by control arm 348 extending from float 346. With float 346 in the fully raised position shown in FIG. 12, control arm 348 has pulled ribbon valve element 340 to the closed position in which the valve element covers and seals valve seat 334. In its lowermost position as shown in FIG. 16, float 346 has peeled valve element 340 off valve seat 334 and down onto guide ramp 358 to the open venting position.

Figure 13:
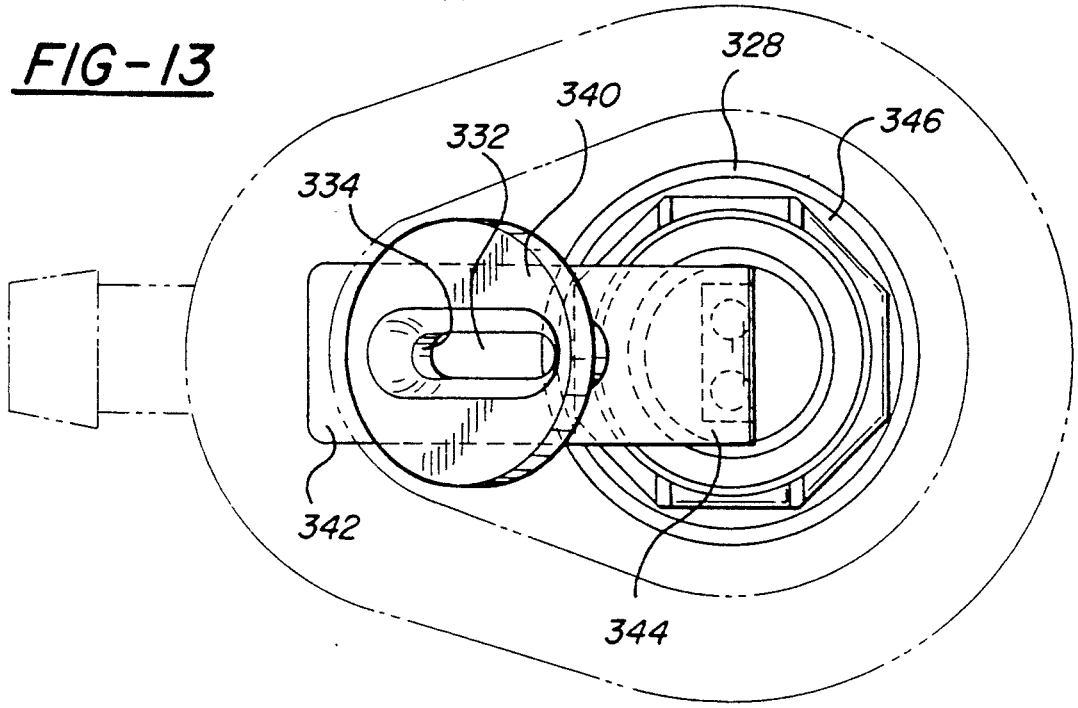
FIG. 13 is a plan view of the valve of FIG. 12.
Figure 14:
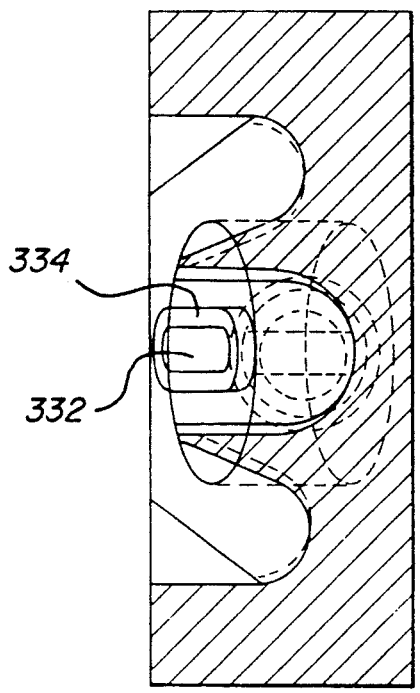
FIG. 14 is a side section view of the vent outlet area of the valve of FIG. 12.
Figure 15:
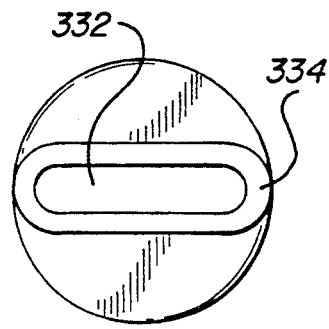
FIG. 15 is a plan view of the vent outlet of FIG. 12.

Still referring to FIGS. 12-16, the details of the ribbon valve element and its opening structure are described as follows. The longitudinal axis of valve seat 334 is aligned with the longitudinal axis of valve element 340 as best shown in FIG. 13. From the closed position shown in FIG. 12, valve element 340 is accordingly peeled off valve seat 334 in the longitudinal direction, beginning at upper end 338 of the valve seat. The long lever arm and slot-like oval opening of vent outlet 332 and valve seat 334 create a strong mechanical advantage which peels the ribbon valve element 340 away from valve seat 334 despite pressure in the fuel tank which resists the opening of the valve.

Further mechanical advantage is obtained with free end 344 of ribbon valve element 344 extending beyond upper end 338 of valve seat 334. When the valve is in the closed position as shown in FIG. 1, there is a tank/canister pressure differential acting in the area of valve element 340 overlying vent outlet 332. This tank/canister pressure differential tends to hold the valve in the closed position, since tank pressure is typically greater than atmospheric canister pressure. Free end 344 of ribbon valve element 340 extending beyond upper end 338 of valve seat 334 has no pressure differential acting across it to keep it closed; i.e., free end 344 of valve element 340 has tank pressure acting on both sides. Accordingly, upper end 338 and free end 344 of the ribbon valve element define an initial pivot point and lever arm through which the float acts to initially break the seal between valve element 340 and valve seat 334. Once the seal has been initially broken by this first independent lever arm action, the valve element 340 defines a single lever arm through which opening force is applied to peel it from valve seat 334.

The opening of ribbon valve element 340 therefore comprises a two-step motion: the initial pivotal break effected by the independent lever arm motion of free end 344 of the ribbon valve element about the pivot point of upper end 338 of valve seat 334; and, the subsequent integral lever-type peeling action of the entire valve element 340. The flexible nature of valve element 340 enables it to form a tight seal with valve seat 334, as well as providing for the powerful peel away opening force. However, when in the open, relaxed position, the flexible ribbon might tend to go slack and bunch up or otherwise deform so as to affect the proper functioning the valve. Accordingly, curved guide ramp 358 serves to properly tension and support ribbon valve element 340 when the valve is in the open position. In this manner the open valve element remains unaffected by pressure changes within the valve which might otherwise tend to deform it. Liquid fuel is also prevented from collecting on the valve element should it somehow reach that level within the valve, since it simply drains off the surface of valve element 340 conforming to guide ramp 358.

The rounded surface of upper end 338 of valve element 334 permits a tight seal at that point between the valve seat and the valve element. Additionally, it permits the free end 344 of the valve element 340 to be wrapped around or pulled upwardly about end 338 by control arm 348 of the float beyond the plane of valve seat 334 and the remainder of the valve element 340. This again ensures a tight seal and gives a head start to the lever action needed to unseal the valve element when the float drops with the liquid fuel level.

In a further embodiment of the ribbon valve element, not shown, valve element 340 is reinforced along its lower surface opposite vent outlet 332 by a number of tracks or ribs formed integrally thereon. This serves to stiffen valve element 340 in the vicinity of vent outlet 332 to prevent it from being forced into the vent outlet past valve seat 334 by tank pressure acting on its lower surface.

As noted above, the float 346 and associated rollover structure 347 in the embodiments of FIGS. 12-16 can be the same as that shown and described in the embodiments of the invention in FIGS. 1-11.

It is to be understood that the foregoing description is of illustrative embodiments in accordance with 35 USC 112, and is not intended to be limiting, as many embodiments of the invention are possible within the scope of the appended claims.

We claim:

1. A liquid- and gravity-responsive rollover vent control valve for mounting on a fuel tank to selectively vent fuel vapor from the tank to a vapor trap such as a carbon canister, the valve comprising:
   a hollow valve body having a fuel vapor inlet communicating with the tank interior and a fuel vapor vent outlet communicating with the vapor trap;
   valve means associated with the vent outlet, the valve means movable between an open venting position and a closed non-venting position;
   fuel level responsive control means in the hollow valve body connected to the valve means to open and close the valve means in response to the level of liquid fuel in the tank; wherein,
   the valve means include lever means extending radially from the vent outlet and connected to the control means at a point spaced radially from the vent outlet to amplify the opening force applied to the valve means by the control means, the lever means connected to the control means by lever actuator means, the lever actuator means comprising an axial guide defining a first axial range of travel for the lever means relative to the control means, the lever actuator means further comprising a contact element defining a second pivotal range of travel for the valve means relative to the control means, the contact element including two contact points of varying height relative to the control means to limit the second pivotal range of travel of the lever means relative to the control means.

2. A rollover vent control valve as defined in claim 1, wherein the two contact points are aligned with the vent outlet, a first lower contact point at a maximum distance from the vent outlet to provide an initial pivotal opening moment to the lever means, and a second higher contact point nearer the vent outlet to provide a locking connection and subsequent rectilinear opening force to the lever means.

3. A rollover vent control valve as defined in claim 2, wherein the contact element comprises an angled flange.

4. A liquid- and gravity-responsive rollover vent control valve for mounting on a fuel tank to selectively vent fuel vapor from the tank to a vapor trap such as a carbon canister, the valve comprising:
   a hollow valve body having a fuel vapor inlet communicating with the tank interior and a fuel vapor vent outlet communicating with the vapor trap;

valve means associated with the vent outlet, the valve means movable between an open venting position and a closed non-venting position;

fuel level responsive control means in the hollow valve body connected to the valve means to open and close the valve means in response to the level of liquid fuel in the tank;

the valve means including lever means extending radially from the vent outlet and connected to the control means at a point spaced radially from the vent outlet to amplify the opening force applied to the valve means by the control means;

the lever means connected to the control means by opening means providing an initial pivotal opening moment to the valve element at a first greater distance from the vent outlet, a subsequent locking connection between the control means and the valve element at a second lesser distance from the vent outlet, and a final axial opening force to pull the valve element completely free of the vent outlet.

5. A rollover vent control valve as defined in claim 4, wherein the opening means include axial guide means to which the valve element is connected to slide axially therealong, limited by two contact points located on the axial guide means at different heights relative to the control means, the lower of the two contact points at a greater distance from the vent outlet.

6. A rollover vent control valve as defined in claim 5, wherein the opening means comprise an axial post extending from the control means, the axial post ending in an angled flange having a lower edge a first greater distance from the vent outlet and an upper edge a second lesser distance from the vent outlet.

7. A rollover vent control valve as defined in claim 6, wherein the axial post is slightly curved away from the vent outlet.

8. A liquid-responsive rollover vent control valve for mounting on a fuel tank to selectively vent fuel vapor from the tank to a vapor trap such as a carbon canister, the valve comprising:

a hollow valve body having a fuel vapor inlet communicating with the tank interior and a fuel vapor vent outlet communicating with the vapor trap;

valve means associated with the vent outlet, the valve means movable between an open venting position and a closed non-venting position;

a fuel level responsive control element in the hollow valve body connected to the valve means to open and close the valve means in response to the level of liquid fuel in the tank; wherein, the control element and the vent outlet are axially offset, the valve means including lever means extending between the valve means and the control element to increase the opening force exerted by the control element on the valve means, the control element including hammer claw opening means connected to the lever means to provide an initial pivotal opening moment to the valve means and a subsequent rectilinear opening force to the valve means.

9. A rollover vent control valve as defined in claim 8, wherein the hammer claw means comprise two contact points, the first contact point at a maximum distance from the vent outlet to provide an initial pivotal opening moment to the valve means, and the second contact point providing a locking connection and subsequent rectilinear opening force to the valve means.

10. A rollover vent control valve as defined in claim 9, wherein the hammer claw means comprise an axial post along which the lever arm freely rides in the axial direction, and an angled flange on the end of the post, the flange angled with respect to the post such that the first contact point is defined by a lower edge of the flange a first greater distance from the vent outlet, and the second contact point is defined by an upper edge of the flange a second lesser distance from the vent outlet.

11. A rollover vent control valve as defined in claim 10, wherein the axial post is slightly curved away from the vent outlet.

12. A rollover vent control valve as defined in claim 8, wherein the valve means comprise a valve plate having a vent closure portion and a lever arm portion, the lever arm portion extending to and connected to the hammer claw means.

13. A rollover vent control valve as defined in claim 12, wherein the vent closure portion of the valve plate rests on a centering bead on an upper surface of the control element.

14. A rollover vent control valve as defined in claim 12, wherein the centering bead is cruciformed in cross-section.

15. A rollover vent control valve as defined in claim 8, wherein the control element includes gravity-operated rollover structure.

16. A rollover vent control valve as defined in claim 8, wherein the control element comprises a float member having a density slightly greater than liquid fuel.

17. A rollover vent control valve as defined in claim 16, wherein the control element further includes a bias spring in the hollow valve body acting on the float member to make it buoyant when submerged in liquid fuel.

18. A rollover vent control valve as defined in claim 12, wherein the valve plate comprises a flexible material.

19. A liquid-responsive rollover vent control valve for mounting on a fuel tank to selectively vent fuel vapor from the tank to a vapor trap such as a carbon canister, the valve comprising:

a hollow valve body having a fuel vapor inlet communicating with the tank interior and a fuel vapor vent outlet communicating with the vapor trap;

valve means associated with the vent outlet, the valve means movable between an open venting position and a closed non-venting position;

a fuel level responsive control element in a hollow valve body connected to the valve means to open and close the valve means in response to the level of liquid fuel in the tank; wherein, the valve means include lever means extending radially from the vent outlet and connected to the control means at a point spaced radially from the vent outlet to amplify the opening force applied to the valve means by the control means, the lever means connected to the control means by lever actuator means comprising an axial post extending from the control means and an angled flange on the end of the axial post, the flange having a lower edge a first greater distance from the vent outlet and an upper edge a second lesser distance from the vent outlet.

20. A valve as defined in claim 19, wherein the post is slightly curved near the angled flange in a direction opposite the vent outlet.

* * * * *